(12) United States Patent
Berard et al.

(10) Patent No.: US 8,414,781 B2
(45) Date of Patent: Apr. 9, 2013

(54) IN-LINE FLOW SEPARATION OF FLUIDS IN A PIPE SEPARATOR

(75) Inventors: Michel Berard, Palaiseau (FR); Kamal Babour, Bures sur Yvette (FR); Ibrahim Babelli, Al-Khobar (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 86 days.

(21) Appl. No.: 13/170,587

(22) Filed: Jun. 28, 2011

(65) Prior Publication Data
US 2011/0253640 A1 Oct. 20, 2011

Related U.S. Application Data

(62) Division of application No. 11/718,937, filed as application No. PCT/EP2005/011138 on Oct. 17, 2005, now Pat. No. 8,002,121.

(30) Foreign Application Priority Data

Nov. 15, 2004 (GB) .................................. 0425167.4

(51) Int. Cl.
*B01D 17/00* (2006.01)
*G01F 1/00* (2006.01)
(52) U.S. Cl. ........ 210/800; 210/739; 210/744; 210/747; 210/767
(58) Field of Classification Search .................. 210/112, 210/114, 170.01, 511, 513, 532.1, 533, 534, 210/536, 537, 538, 539, 540, 800, DIG. 5, 210/248, 739, 744, 747, 767; 73/861.04; 137/172, 173, 203; 166/75.11, 75.12, 267, 166/357; 96/55
See application file for complete search history.

(56) References Cited

U.S. PATENT DOCUMENTS

| | | | | |
|---|---|---|---|---|
| 1,516,132 A | * | 11/1924 | Allen et al. | ..................... 210/109 |
| 1,762,538 A | | 6/1930 | Worthington | |
| 5,443,120 A | | 8/1995 | Howell | |
| 5,589,642 A | | 12/1996 | Agar et al. | |
| 5,837,152 A | | 11/1998 | Komistek et al. | |
| 6,468,335 B1 | * | 10/2002 | Polderman | ...................... 96/183 |

(Continued)

FOREIGN PATENT DOCUMENTS

| | | |
|---|---|---|
| GB | 2326895 A | 1/1999 |
| GB | 2408803 A | 6/2005 |
| WO | 0201044 A1 | 1/2002 |
| WO | WO 2004/016907 A1 * | 2/2004 |

OTHER PUBLICATIONS

Atkinson et al. , "SPE 63118: Qualification of a Nonintrusive Multiphase Flow Meter in Viscous Flows," SPE International, 2000: pp. 1-12.
Theuveny et al., "SPE 76766: Multiphase Flowmeter Application for Well and Fiscal Allocation," SPE International, 2002: pp. 1-12.

(Continued)

*Primary Examiner* — Duane Smith
*Assistant Examiner* — Paul J Durand
(74) *Attorney, Agent, or Firm* — Bridget Laffey; Jakub Michna; Rachel E. Greene

(57) ABSTRACT

An in-line flow separator comprises an uphill section of pipeline which, in use, carries a gravitationally stratified flow of a first liquid and a second denser liquid. The second liquid forms a sump extending uphill from the foot of the uphill section, and an interface between the first and second liquids on the uphill section is inclined from the horizontal. An extraction port in the pipeline extracts the second liquid from the sump.

13 Claims, 3 Drawing Sheets

U.S. PATENT DOCUMENTS

| | | |
|---|---|---|
| 6,547,005 B2 | 4/2003 | Haheim |
| 6,719,048 B1 | 4/2004 | Ramos et al. |
| 6,755,978 B2 | 6/2004 | Oddie |
| 8,002,121 B2 | 8/2011 | Berard et al. |
| 2005/0150842 A1* | 7/2005 | Puik .............................. 210/744 |

OTHER PUBLICATIONS

Jayawardane et al., "SPE 77405: PVT Sampling with Multiphase Flowmeters—Theoretical Justifications," SPE International, 2002: pp. 1-11. Dec. 31, 2012.

* cited by examiner

IN-LINE FLOW SEPARATION OF FLUIDS IN A PIPE SEPARATOR

CROSS REFERENCE TO RELATED APPLICATIONS

This patent application is a divisional application from U.S. patent application Ser. No. 11/718,937 filed Apr. 25, 2008 entitled "IN-LINE FLOW SEPARATION OF FLUIDS IN A PIPE SEPARATOR," now U.S. Pat. No. 8,002,121, which is a 371 application from PCT/EP2005/011138, entitled "IN-LINE FLOW SEPARATION OF FLUIDS IN A PIPE SEPARATOR" filed under the PCT on Oct. 17, 2005; which claims priority to UK application number 0425167.4, entitled "AN INCLINED FLUID SEPARATION SYSTEM" filed in the United Kingdom on Nov. 15, 2004, now United Kingdom Patent No. 2 420 132 which is incorporated by reference herein in its entirety.

FIELD OF THE INVENTION

The present invention relates to in-line flow separation, and particularly, but not exclusively, to in-line flow separation on oil pipelines.

BACKGROUND OF THE INVENTION

Oil pipelines, particularly those extending from wellheads, typically carry a mixture of oil and water, and often significant amounts of gas.

Removal of the water from the oil is desirable, and many types of separators are known in the art.

In particular, gravity separators, which rely on the higher density of water than oil for separation of the phases, are commonly used. In a conventional gravity separator, separation is usually achieved by allowing the fluid phases to have a few minutes of stagnant retention time under the influence of gravity alone. Retention time on the order of minutes necessitates large and bulky vessels to achieve separation between the liquid phases.

The most common type of water separator is a large tank separator. However, tank separators are bulky and present operational difficulties e.g. for offshore operation due to limits on available space. Furthermore, tank separators, being bulky, are typically provided as centralised facilities accepting co-mingled production from a number of pipelines. However, this means that the production pipelines which supply such separators (sometimes over long distances) are often overloaded with water and therefore larger and more costly than they need to be.

U.S. Pat. No. 5,837,152 discloses a gravity tank separator in which the tank is formed as an elongate cylinder disposed obliquely to the horizontal.

Several alternatives have been suggested to replace the dependence on conventional gravity tank separation, of which cyclonic separation and in-line separation have received considerable attention recently. Cyclonic in-line separation has been applied successfully to mixtures of two phases with highly contrasting densities, such as the case in degassing and deliquidising. In-line separation of two liquids of relatively comparable densities has also been demonstrated successfully. This latter technology offers significant advantages over conventional tank gravity separation, such as reduction in equipment size, separation while liquid is being transported, and improved emulsion breaking. However, the separation is still effectively based on gravitational settling of stagnantly retained liquids.

U.S. Pat. No. 6,755,978 discloses an apparatus for separating a first fluid from a mixture of a first and a second fluid. The apparatus has a settling chamber surrounding a production pipe for the flowing mixture. At least one aperture allows the mixture to flow into the settling chamber from the production pipe.

U.S. Pat. No. 6,719,048 discloses an apparatus for the downhole separation of water from the oil/gas in a well. Gravity is allowed to work on a non-vertical section of the well to separate fluid components, and the separated components are then pumped to the surface or into a subterranean discharge zone using separated flow paths. Detectors are used to control the pumping to keep unsettled/unseparated mixture away from the separated flow paths.

WO 02/01044 proposes an inclined separator for separating well fluids. The separator has an inlet which comprises insert tubes for well fluids, and at least two outlets for discharge of the separated fluids. The insert tubes extend from one of the ends of the separator to a longitudinally central position. The upper of the outlets is for the discharge of the lightweight fraction of the well fluids, and the lower of the outlets is for the discharge of the heavier fraction.

SUMMARY OF THE INVENTION

The present invention is at least partially based on the realisation that, as long as the flow velocity is not too high, the stratification that often occurs between liquids of different density e.g. when being carried by a pipeline presents an opportunity for gravity-based separation of the more dense liquid. In particular, when the pipeline has an upwardly inclined section in the direction of flow, the denser liquid slows down and its holdup does not change appreciably with changes in the flow rate of the denser liquid itself. Its holdup depends, rather, for a given pipeline inclination and for given physical properties of the liquids, on the flowrate of the less dense liquid. Effectively, the denser liquid forms a sump extending downstream (i.e. uphill) from the foot of the uphill section. If the denser liquid is extracted from the sump at a rate equal to its total flow rate into the pipeline, then the sump will tail off at some position on the uphill section.

Thus, in general terms, the present invention provides (i) a flow separator for separating two liquids of differing density, the separator being adapted to provide a gravitationally stratified flow of the liquids such that an interface between the liquids is inclined from the horizontal, and (ii) a method of separating two liquids of differing density comprising: providing a gravitationally stratified flow of the liquids such that an interface between the liquids is inclined from the horizontal.

The inclined liquid/liquid interface defines an upper surface of a sump formed by the second liquid. The inclination of the interface is in contrast with known in-line gravity separators, such as that described in WO/02/01044, in which there is no stratified liquid flow such that the interface between separated hydrocarbon and water is horizontal. Indeed, the present invention facilitates true in-line separation in the sense that it does not require the retention of stagnant liquid in a settling chamber, but rather separation occurs while the liquids flow.

As to known cyclone separators, these may at some point produce an interface between separated liquids which is inclined from the horizontal, but the separation is of course produced by induced cyclonic motion rather than by gravitation.

More particularly, in a first aspect the present invention provides an in-line flow separator comprising:

an uphill section of pipeline which, in use, carries a gravitationally stratified flow of a first liquid and a second denser liquid, whereby the second liquid forms a sump extending uphill from the foot of the uphill section, and an interface between the first and second liquids on the uphill section is inclined from the horizontal; and an extraction port in the pipeline for extracting the second liquid from the sump.

The uphill section of pipeline has an angle of inclination to the horizontal, and typically, e.g. under conditions of steady state flow, the interface between the first and second liquids on the uphill section inclines upwardly at substantially the same angle to the horizontal.

However, when the second liquid is extracted from the sump at a rate equal to its flow rate into the separator, the sump tails off at a position on the uphill section. At the sump tail, the interface between the first and second liquids is typically substantially horizontal.

The rate of extraction at the extraction port may be controlled by a pump or a valve.

An advantage of the separator is that it can be easily retrofitted to a pipeline that has a suitable inclined section.

The pipeline may be an oil pipeline, the first liquid being oil and the second liquid being water. The separator is typically installed above-ground, and preferably is installed at a wellhead. However, the present invention is generally applicable to situations where stratified flow of two liquids with varying densities occurs. Thus, areas of application of the invention include, but are not limited to, the petrochemical, food, and paint industries.

Conveniently, the extraction port may be located immediately downstream of the foot of the uphill section.

The extraction port may take the form of a pipe extending downwards from the underside of the pipeline, and having an upper portion with an enlarged cross-sectional area which produces a relatively low initial extraction flow velocity into the port, and a lower portion with a narrower cross-sectional area producing a subsequent higher extraction flow velocity. Thus, if a droplet of the first liquid is entrained in the extracted second liquid, the droplet may still have an opportunity to escape back into the pipeline because, in the upper portion, gravitational forces may not be dominated by frictional forces, whereas they are more likely to be thus-dominated in the narrower lower portion.

There may be more than one extraction port for extracting the second liquid from the sump. By employing a plurality of ports, it is possible to extract more liquid without disturbing the stratified flow in the pipeline.

Preferably the extraction port(s) do not reduce or obstruct the cross-sectional area of the pipeline. In this way, pressure losses and disturbances to the stratified flow can be reduced or eliminated.

Indeed, more preferably, there are no significant obstructions or reductions in the cross-sectional area of the pipeline from one end of the separator to the other.

The length of a downstream tail of the sump and the thickness of the sump will be dependent on factors such as the pipeline diameter, the first and second liquid properties, the first liquid flow rate, and the angle of inclination of the uphill section. Typically (e.g. in oil pipeline applications), the angle of inclination of the uphill section to the horizontal is in the range from 2° to 6°. Consequently, the liquid/liquid interface on the uphill section (excluding at the sump tail with its typically horizontal liquid/liquid interface) generally has the same inclination to the horizontal. We have found that inclinations beyond 6° can have an adverse effect on stratification.

Preferably, the separator further comprises means for characterising the flow rate of the second liquid into the uphill section, whereby the rate of extraction of the second liquid at the extraction port can be controlled on the basis of the characterised flow rate of the second liquid.

Some embodiments of the present invention make use of the sump tail to control the rate of extraction of the denser liquid.

Consequently, the means for characterising the flow rate of the second liquid into the uphill section may be a sensor arrangement on the uphill section for sensing the position of a downstream tail of the sump, whereby the rate of extraction of the second liquid at the extraction port can be controlled on the basis of the behaviour of the sump tail.

Thus, some embodiments provide a system for controlling sump flow in a pipeline which, in use, carries a stratified flow of a first liquid and a second denser liquid, the system comprising:

a section of the pipeline in which the stratified flow is uphill, whereby the second liquid forms a sump extending downstream from the foot of the uphill section;

an extraction port in the pipeline for extracting the second liquid from the sump, and a sensor arrangement on the uphill section for sensing the position of a downstream tail of the sump, whereby the rate of extraction of the second liquid at the extraction port can be controlled on the basis of the behaviour of the sump tail.

For a given extraction rate, the sump tail moves downstream when extra second liquid enters the pipeline, and retreats when the second liquid becomes deficient. Thus, if the sump tail travels too far from the extraction port, the operator knows that the rate of second liquid extraction should be increased, and if the sump tail moves too close to the port, the operator knows that the rate of second liquid extraction should be decreased. Furthermore, by maintaining the sump tail a safe distance from the extraction port, an operator can ensure that substantially only the second liquid is extracted. Computer-based control means may be provided to automatically control the rate of second liquid extraction e.g. on the basis of any one or combination of the position of the sump tail, the speed of movement of the tail and the direction of movement of the tail.

Preferably, the length of that portion of the uphill section over which the position of the sump tail is sensed by the sensor arrangement is at least a distance of 15 D, and more preferably at least 20 D, where D is the internal diameter of the pipeline. The longer the uphill section, the more reliably the sump tail can be maintained in the section. If, for example, $Q_{sl,i} > Q_{sl,e}$ (where the second liquid flow rate into the pipeline is $Q_{sl,i}$ and second liquid is extracted out of the pipeline at a rate $Q_{sl,e}$), the time it takes for the tail to move from the (most downstream) extraction port to the top of the uphill section is $(Q_{sl,i} - Q_{sl,I})/(SH_{sl}L)$, where S denotes the pipeline internal cross-sectional area, L denotes the distance between the port to the top of the uphill section, and $H_{sl}$ denotes the second liquid holdup (which is primarily governed by the first liquid flow rate, the pipeline inclination, and the pipeline internal diameter).

Basing the extraction of the second liquid from the sump on the behaviour of the sump tail can be particularly advantageous with respect to separator control. The time scale of such a separator is typically of the order of seconds to minutes (depending on pipe diameters and lengths), which renders the separator amenable to control with very simple parameters. Such a separator requires no measurement of flowrates, holdup, or properties, and it does not require repeated calibration of the instruments, the only measurement being the detection of the downstream tail of the sump.

Conveniently, the sensor arrangement may comprise a plurality of sensors spaced along the uphill section, the sensors determining the position of the sump tail on the basis of differing properties for the first and second liquids. These may be electronic sensors sensing electrical properties. However, any sensors capable of detecting contrasting physical or chemical properties may be used. For example, optical sensors may be employed.

However, if electronic sensors are used, each sensor may comprise a spark plug, as manufactured for use in an internal combustion engine (ICE), each spark plug being arranged to perform electrical measurements across the wall of the pipeline. Spark plugs have electrical insulation, temperature and pressure ratings which in general are above the ratings (typically 100,000 V, 200° C., 34.47 MPa [5,000 psi]) required in the oil industry. They are also readily obtainable even in poorly developed countries or remote oilfield environments, making spark plug-based sensors simple and inexpensive to produce.

Alternatively, rather than making use of a sump tail to control the rate of extraction of the denser liquid, the means for characterising the flow rate of the second liquid may be a system for determining the cut of the second liquid entering the separator, whereby the rate of extraction of the second liquid at the extraction port can be controlled on the basis of the determined second liquid cut. Again, computer-based control means may be provided to automatically control the rate of second liquid extraction.

Suitable systems for determining liquid cuts are known to the skilled person. Such a system should be included in the separator upstream of the extraction port. For example, if there is gas in the flow, a multi-phase flow meter, such as Schlumberger's Vx™ gamma-ray multi-phase flow meter (see Society of Petroleum Engineers (SPE) papers 63118, 77405 and 76766), may be used to determine the second liquid cut. However, simpler systems may be used if a gas diverter (see below) is used to remove gas from the pipeline before the liquid flow rate measurement is made. Such a system may comprise a holdup meter for the second liquid combined with a flowmeter for measuring the total liquid flow rate in the pipeline, the cut of the second liquid being estimated by combining the two measurements. A Coriolis mass flow meter may be used effectively to measure the liquid flowrate(s) and second liquid cut. A microwave cut meter for the second liquid may also be used in conjunction with a liquid flow meter such as an ultrasonic flowmeter.

In general, if a system for determining the cut of the second liquid entering the separator is used, rather than a sensor arrangement on the uphill section for sensing the position of a downstream tail of the sump, it is desirable for the separator to further comprise a flow meter (of known type) for measuring the flow rate of extracted second liquid. This allows the second liquid extraction rate to be matched to the second liquid inflow rate.

In some embodiments, one or more further separators are installed in series downstream of the first separator. Each further separator has its own uphill section and can be used to extract a proportion of the second liquid flow. Thus a sump tail only forms on an uphill section if the rate of water extraction from the respective extraction port equals the water flow rate into that separator. Of course, in use, any separator downstream of such a tail is redundant. Preferably the first separator and each further separator has a flow meter for measuring the flow rate of second liquid extracted by the respective separator. In these embodiments, for each separator downstream of the first separator, the flow rate of the second liquid into the respective uphill section can be characterised by subtracting the total flow rate of second liquid extracted by the upstream separators from the flow rate of the second liquid into the first separator.

The separator may comprise a gas diverter at a position upstream of the extraction port and/or upstream of the uphill section for removing gas from the pipeline. Many oil wells also produce significant amounts of gas, and such a diverter may then be particularly advantageous as the present inventors have found that the separator can be poorly tolerant to gas in the pipeline. In particular, gas turbulence can destroy the interface between the two liquids. With the implementation of gas diversion, the separator effectively operates as a multi- or three-phase separator, each of the first and second liquids and the gas being defined as a "phase".

In particular, the present inventors realised that gas in the pipeline can be detrimental to the controlled extraction of the second liquid from the sump. That is, even in embodiments which do not make use of the sump tail to control the rate of extraction of the denser liquid, it is advantageous to remove gas from the pipeline.

Typically the gas diverter removes substantially all the gas from the pipeline.

Preferably the gas diverter does not reduce or obstruct the cross-sectional area of the pipeline. In this way, pressure losses and disturbances to the stratified flow can be reduced or eliminated.

Preferably, the gas diverter removes gas from the pipeline at a position upstream of the uphill section. For example, the separator may further comprise a section of the pipeline in which the stratified flow is downhill, the downhill section being upstream of the uphill section, and the gas diverter removing gas from the pipeline on the downhill section. Because downhill sections promote stratification, even at very high flow rates, such an arrangement can significantly reduce turbulence at the position where gas is removed. Thus liquid/gas interactions can be minimised, and the likelihood of liquid unintentionally being removed by the gas diverter can be reduced.

The gas diverter may comprise a pipe extending substantially vertically upwards from the upper side of the pipeline at the pipeline position at which gas is removed. This simple arrangement has been found to perform well under a range of operational conditions. It can be a completely passive in the sense that, even under transient operating conditions when the amount of gas in the flow can vary significantly, no active control systems have to be installed in order to divert gas efficiently through the pipe while avoiding liquid being carried over through the diverter as well. Preferably the pipe extends vertically to an elevation which is higher than the top of the uphill section. Indeed, in general, the pipe should extend vertically to an elevation which prevents liquid being carried over during transient operation.

Less desirably, more actively-controlled gas diverters may be used. For example, U.S. Pat. No. 5,589,642 describes a multi-phase fluid flow meter which incorporates a gas flow path. Pressure sensors and a computer determine when to open the path in response to substantial gas flows.

The diverted gas may be reintroduced into the pipeline downstream of the uphill section. For example, the gas diverter can be arranged to rejoin diverted gas to the pipeline downstream of the uphill section. Preferably, in such separators, the elevation of the pipeline position at which the gas diverter rejoins diverted gas to the pipeline is lower than the elevation of the pipeline position at which the gas diverter removes gas from the pipeline. This helps to ensure that liquid does not climb into the diverter. Preferably the gas diverter rejoins diverted gas to the pipeline at a downhill section of the pipeline.

The diverter may comprise a gas flow meter (of known type) for measuring the flow rate of diverted gas. Indeed, preferably, the separator then also includes a first liquid flow meter for measuring the flow rate of first liquid in the pipeline after all the second liquid is extracted, and one or more second liquid flow meters for measuring the flow rate of second liquid extracted at the respective extraction port(s). Such an arrangement allows the separator to function as a multi-phase meter.

Optionally, in embodiments which comprise a gas diverter, the means for characterising the flow rate of the second liquid into the uphill section is not a sensor arrangement on the uphill section for sensing the position of a downstream tail of the sump.

In a second aspect, the present invention provides a method of in-line flow separation comprising:

carrying a gravitationally stratified flow of a first liquid and a second denser liquid along an uphill section of pipeline, whereby the second liquid forms a sump extending uphill from the foot of the uphill section, and an interface between the first and second liquids on the uphill section is inclined from the horizontal, and extracting the second liquid from the sump.

Thus the method corresponds to the separator of the previous aspect, and any one or combination of the optional features of that separator pertain also to the method of the second aspect.

For example, the method preferably further comprises characterising the flow rate of the second liquid into the uphill section, whereby the rate of extraction of the second liquid is controlled on the basis of the characterised flow rate of the second liquid.

More preferably, the characterisation of the flow rate of the second liquid into the uphill section is performed by sensing the position, on the uphill section, of a downstream tail of the sump, and the rate of extraction of the second Thus, some embodiments provide a method for controlling sump flow in a pipeline comprising:

carrying a stratified flow of a first liquid and a second denser liquid along the pipeline, the pipeline having a section in which the stratified flow is uphill, whereby the second liquid forms a sump extending downstream from the foot of the uphill section, sensing the position, on the uphill section, of a downstream tail of the sump, and extracting the second liquid from the sump, the rate of extraction of the second liquid being controlled on the basis of the behaviour of the sump tail.

The method of the second aspect may further comprise removing gas from the pipeline at a position which is upstream of the position at which the second liquid is extracted from the sump and/or upstream of the uphill section. However, when gas is removed in this way, the characterisation of the flow rate of the second liquid into the uphill section may exclude sensing the position, on the uphill section, of a downstream tail of the sump. Instead, for example, the characterisation of the flow rate of the second liquid into the uphill section can be performed by determining the cut of the second liquid, the rate of extraction of the second liquid at the extraction port being controlled on the basis of the determined second liquid cut.

BRIEF DESCRIPTION OF THE DRAWINGS

Embodiments of the invention will now be described by way of example with reference to the accompanying drawings in which:

FIG. 2b shows an enlarged view of the extraction port of the sump flow control system of FIG. 2a;

DETAILED DESCRIPTION

Figure 1:
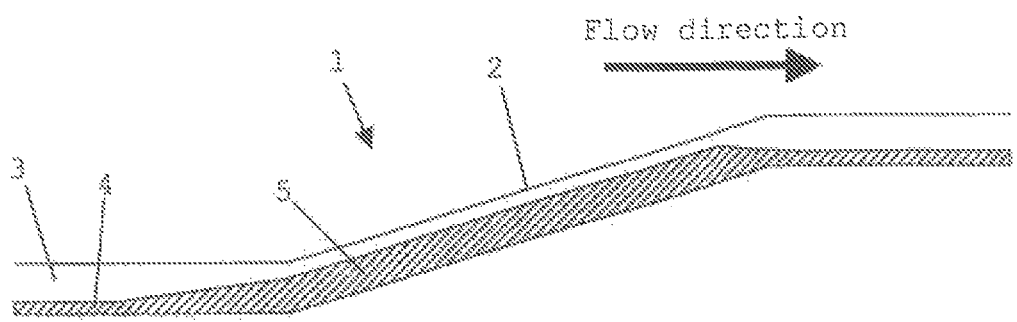
FIG. 1 shows schematically an oil pipeline.

FIG. 1 shows schematically an oil pipeline 1 having an upwardly inclined section 2. A stratified flow of oil 3 and denser water 4 flows along the pipeline in the direction indicated.

When the stratified flow reaches the foot of the inclined section, the thickness of the water layer increases (i.e. the water holdup increases), and maintains that thickness until it reaches the top of the incline. Thus the thickened water layer 5 is effectively a sump. As long as the flowrate of oil is below a certain limit the sump remains intact and is not entrained in the oil flow. Flowrates encountered in oil pipelines under normal conditions are generally below this limit.

Figure 2A:
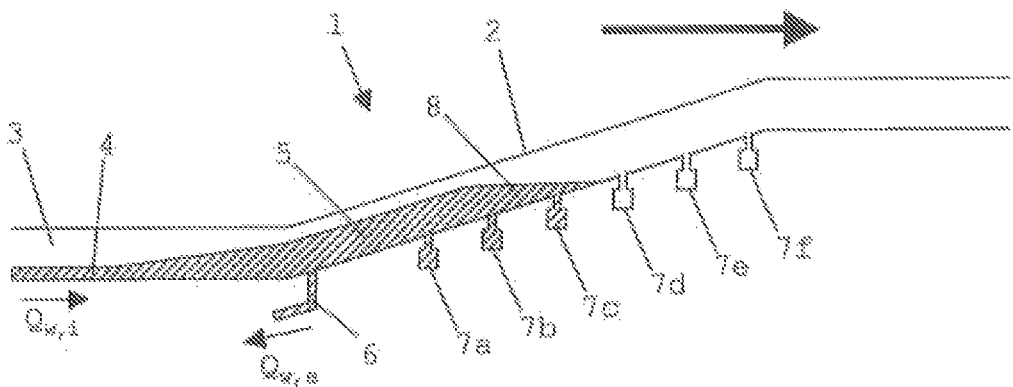
FIG. 2a shows schematically a further oil pipeline having a sump flow control system according to a first embodiment of the present invention.

FIG. 2a shows a further oil pipeline, but now having a sump flow control system according to a first embodiment of the present invention. Equivalent features have the same reference numbers in FIGS. 1 and 2a. An extraction port 6 is positioned just above the foot of inclined section 2, and a series of spaced electronic sensors 7a to 7f are mounted to the underside (at or near the quadrant) of the pipeline and detect the local presence of oil or water on the basis of the different electrical conductivities of oil and water. Of course, instead of a single extraction port, the pipeline could have a plurality of ports.

The water flow rate into the pipeline is $Q_{w,i}$ and water is extracted out of the pipeline through port 6 at a rate $Q_{w,e}$. As $Q_{w,i}$ and $Q_{w,e}$ are approximately equal, a tail 8 forms on the sump 5 on the uphill section. If $Q_{w,i}$ exceeds $Q_{w,e}$, the tail progresses up the uphill section, whereas if $Q_{w,e}$ exceeds $Q_{w,i}$ the tail retreats downhill. The equilibrium (i.e. $Q_{w,i}=Q_{w,e}$) position of the tail and its length depend on several factors such as the pipeline diameter, the oil and water physical properties, the oil flow rate, and the angle of inclination of the uphill section.

In the situation shown in FIG. 2a, the tail ends between sensors 7c and 7d. Therefore, sensors 7a to 7c measure a significantly higher electrical conductivity than sensors 7d to 7f, allowing the position of the tail to be located.

Furthermore, if $Q_{w,i} \neq Q_{w,e}$, then the tail will move at a rate proportional to $\Delta Q_w = Q_{w,i} - Q_{w,e}$. Clearly, the movement will be downstream if $\Delta Q_w$ is positive and upstream if it is negative. Thus not only can an operator ensure that the tail is situated at a "safe" distance from the extraction port and the top of the uphill section, but the speed and direction of movement of the tail, as measured by the sensors, gives an indication of how to change the rate of extraction to match $Q_{w,e}$ to $Q_{w,i}$. Thus the water extraction rate is controlled on the basis of the behaviour of the sump tail on the uphill section.

Preferably, this control is automatically exercised by a computer-based controller (not shown) which receives the conductivity measurements from the sensors and controls e.g. a pump or valve (not shown) at port 6 to vary the rate of extraction.

Preferably, also, a gas diverter (not shown) of known type or as any one herein described is installed upstream of the pipeline of FIG. 2a to remove any gas from the liquid flow. The diverted gas may be reintroduced into the pipeline downstream of the uphill section.

Figure 2B:
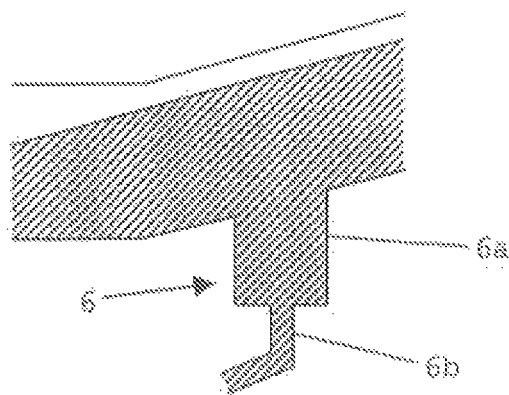

FIG. 2b shows an enlarged view of extraction port 6. It has an upper portion 6a opening to the pipeline with an enlarged cross-sectional area which produces a relatively low initial extraction flow velocity into the port, and a lower portion 6b with a narrower cross-sectional area producing a relatively high extraction flow velocity. Thus, if a droplet of oil is entrained in the extracted water, the droplet still has an opportunity to escape back into the pipeline because, in the wider upper portion, gravitational forces are not dominated by frictional forces, as they are in the narrower lower portion.

Figure 3:
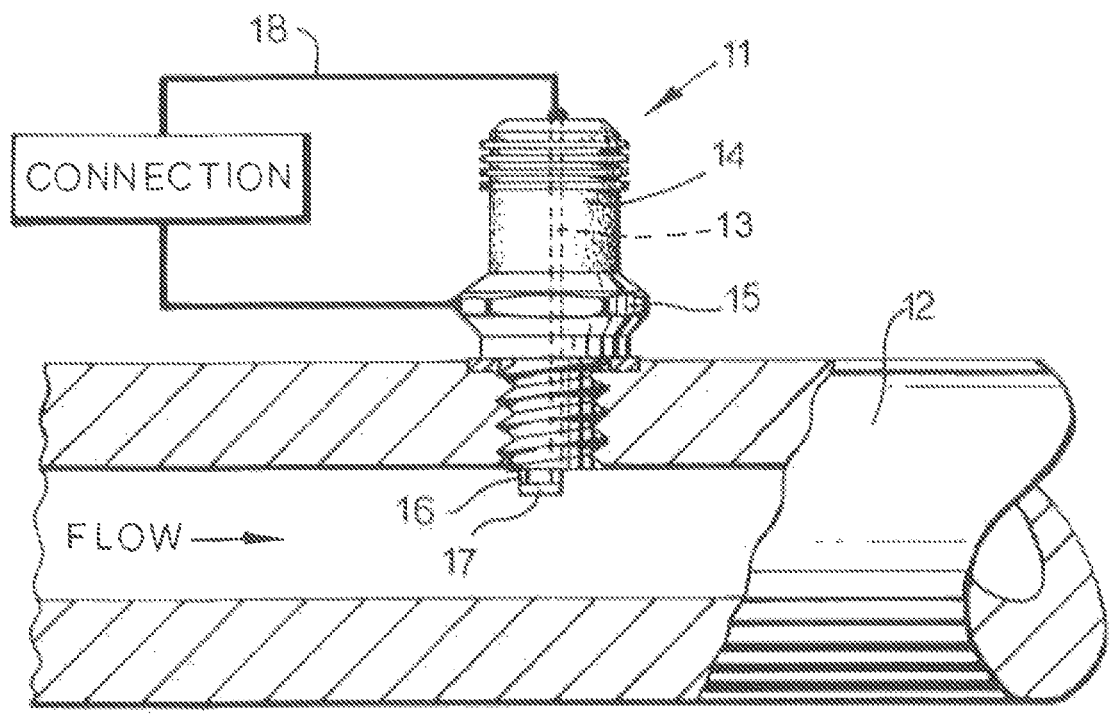
FIG. 3 shows schematically an electronic sensor based on an ICE spark plug.

Conveniently, the electronic sensors can be based on ICE spark plugs. FIG. 3 shows an ICE spark plug 11 mounted in a wall 12 of an oil pipe. The spark plug has a central electrode 13, a ceramic insulator 14 and a steel outer conductor body 15. The conventional side electrode 16 of the outer body has been shortened so that it and the adjacent end of the central electrode can support a sensing element 17 for sensing the resistivity/conductivity of the liquid flowing within the pipe.

An external electrical circuit 18 joins the central electrode and outer conductor body and they can thus be used to communicate electrical power to the sensing element so that it can perform measurements.

Figure 4:
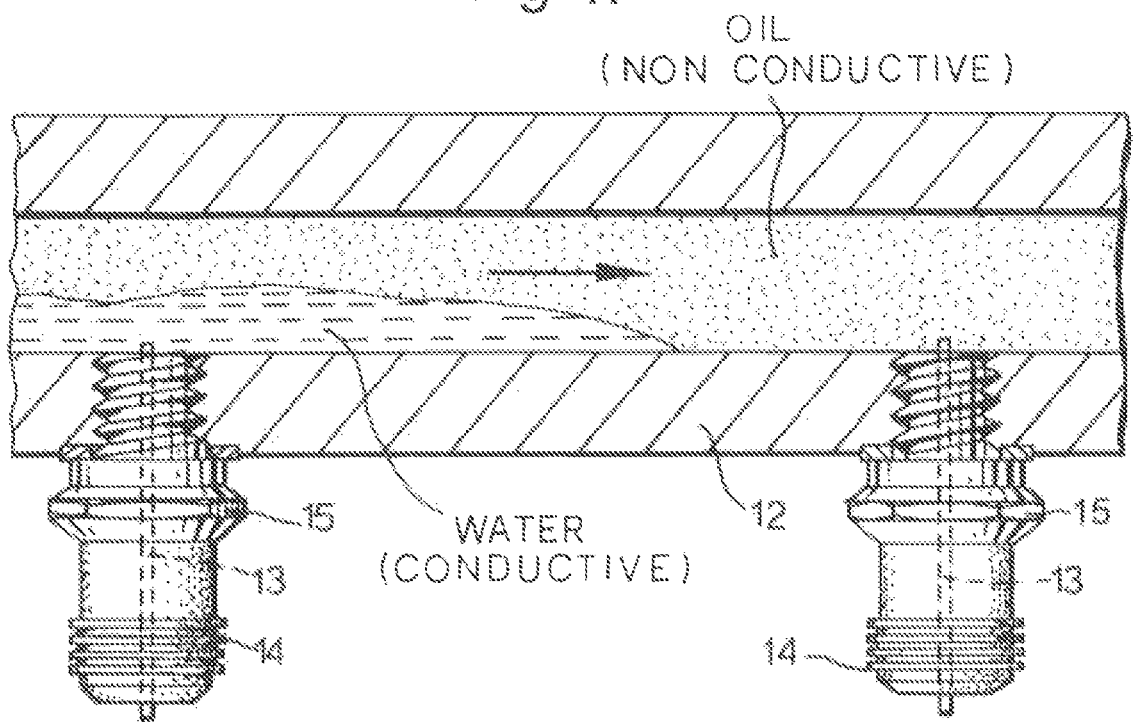
FIG. 4 shows schematically two further sensors based on ICE spark plugs mounted spaced apart in a wall of an oil pipe.

FIG. 4 shows another form of the spark plug-based electronic sensor in which the side electrode of the spark plug has been entirely removed. In FIG. 4, two of these sensors are mounted spaced apart in a wall of an oil pipe. Equivalent features have the same reference numbers in FIGS. 3 and 4.

The sensors of FIG. 4 are used to sense the position of the tail of the water sump discussed above in relation to FIG. 2a. When water is present (as at the left hand sensor), an electrical short occurs between the central electrode and outer conductor body. Conversely, if there is only oil in the pipe (as at the right hand sensor), the impedance between the central electrode and outer conductor body is effectively infinite. Thus the presence of water and the position of the sump tail can be detected by measuring the impedance between the central electrode and outer conductor body.

Figure 5:
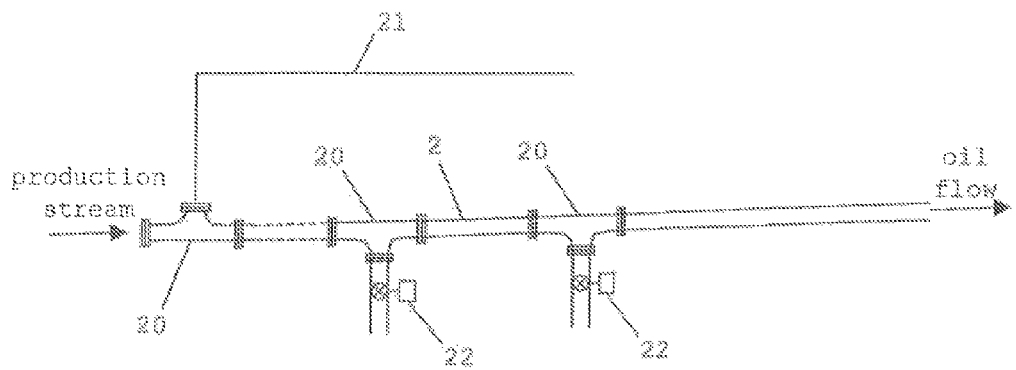
FIG. 5 shows schematically a further oil pipeline having an in-line three-phase separator according to a second embodiment of the present invention.

FIG. 5 shows schematically a further oil pipeline having an in-line three-phase separator according to a second embodiment of the present invention. Equivalent features have the same reference numbers in FIGS. 1, 2a and 5.

In this embodiment the separator has three T-junctions 20. These junctions respectively form a gas extraction port and two spaced water extraction ports. The gas extraction port is upstream of the water extraction ports and upwardly inclined pipeline section 2, and feeds a gas diverter line 21. The water extraction ports are on the upwardly inclined pipeline section 2.

The production stream which enters the pipeline contains a gas/oil/water fluid flow. Except on downhill sections, the oil and water in such flows tend not to stratify because of gas-induced turbulence. However, the gas fraction of the flow is diverted from the production stream at the first T-junction 20 into the gas diverter line 21. The gas diverter is a passive system that needs no active control. The diverted gas can be routed away from the production stream for industrial usage or flaring, or it can rejoin the oil stream at a later stage.

With the gas removed, the remaining oil/water flow can stratify. The water fraction of the stratified flow forms a sump extending upstream from the foot of pipeline section 2, and is extracted through the second and third T-junctions 20. The amount of water extracted is determined by valves 22 which in turn are controlled on the basis of the output of a sensor arrangement (not shown) uphill of the second and third T-junctions 20. The sensor arrangement senses the position of the downstream tail of the sump. In this way, the rate of water extraction can be controlled so as to maintain the sump tail at a position on the upwardly inclined pipeline section 2 above the second and third T-junctions 20. The flow downstream of the sump tail is therefore substantially entirely oil.

The design and operation of the separator is simple and robust. It has no parts which intrude into the fluid flow to alter or obstruct the pipeline cross-section, no moving parts and uses little energy in operation. The T-junctions (which have the same internal bore dimensions as the main pipeline) cause very little pressure drop in the fluid flow.

Figure 6:
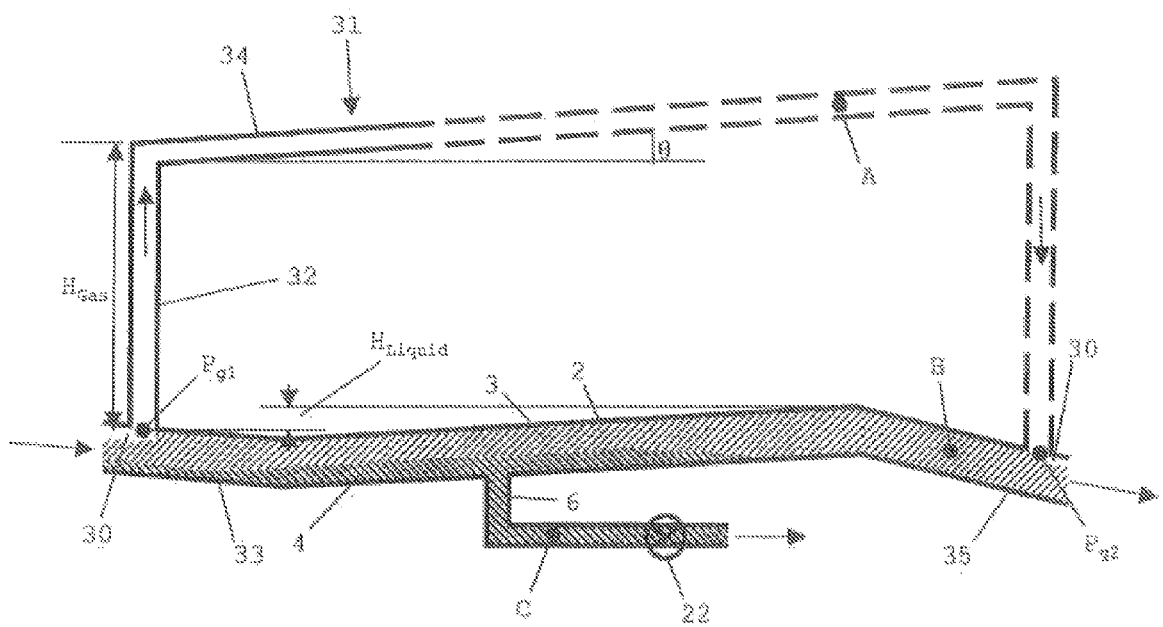
FIG. 6 shows schematically a further oil pipeline having an in-line three-phase separator according to a third embodiment of the present invention.

FIG. 6 shows schematically a further oil pipeline having an in-line three-phase separator according to a third embodiment of the present invention. Equivalent features have the same reference numbers in FIGS. 1, 2a, 5 and 6.

The well production stream contains gas, oil and water and enters the separator at a downhill section 33 of pipeline. A gas diverter 31 comprising a substantially vertically extending pipe 32 connects to the pipeline at the upperside thereof at position $P_{g1}$ on the downhill section, whereby the gas is diverted up pipe 32. Because the flow is downhill, the oil and water tend to stratify in the downhill section even though gas is present upstream of position $P_{g1}$.

Uphill pipeline section 2 follows downhill section 33, and the water fraction of the still-stratified flow forms a sump extending downstream from the foot of the uphill section, and is extracted through extraction port 6. The amount of water extracted is determined by valve 22 which in turn is controlled on the basis of the measured water cut in the production stream. This water cut measurement can be made by a multi-phase flow meter, such as Schlumberger's Vx™ gamma-ray multi-phase flow meter if the measurement is taken upstream of the pipe 32, or a simpler water cut measuring system may be used if the system is installed between pipe 32 and uphill section 2 as the system does not then have to account for gas flows. Alternatively, a sensor arrangement can be installed on the uphill section to measure the position of the downstream tail of the sump, and the amount of water extracted can be controlled on the basis of that position. In any event, the flow immediately downstream of the sump is substantially entirely oil.

Particularly on uphill sections, gas can disturb the stratified oil and water flow and therefore increase the risk of oil being entrained in the extracted water. However, by diverting the gas fraction on the downhill section before the uphill section this problem can be avoided.

The height, $H_{gas}$, of vertically extending pipe 32 can be determined with regard to the following considerations:

When the separator is full of liquid, but without any flow, then the height of the liquid column inside the gas diverter line will be equal to $H_{Liquid}$, i.e. the height of the highest point in the pipeline downstream of $P_{g1}$. For example, if, as shown in FIG. 6, the highest point is top of the uphill section, then the height of the liquid column in pipe 32 when there is no flow will be to equal the difference in elevation between $P_{g1}$ and the top of the uphill section. Of course, if there is a check valve on the pipeline between the junction and the highest point in the pipeline downstream of $P_{g1}$, then $H_{Liquid}$ is the height of the highest downstream point in the pipeline before the check valve.

When flow is initiated through the separator, the liquid flowing in the pipeline encounters a pressure drop due to pipe wall friction, interfacial friction between the phases, and pressure losses due to fittings. The total pressure drop along the pipeline from $P_{g1}$ to the highest point in the pipeline (or to the highest point between a check valve and the junction) causes the liquid in pipe 32 to rise by an amount $H_{\Delta P}=\Delta P/(\rho g)$, where $\Delta P$ is the pressure loss due to the fluid flow, $\rho$ is the average fluid density in the pipeline, and g is acceleration due to gravity.

If initially there is no gas flow through the gas diverter, either because it is closed or because there is no gas flowing through the separator (for example as a result of a gas knockout system upstream of the separator), then there will be a liquid column in pipe 32. However, when gas is introduced into the separator and the gas diverter is open, there is a transient stage where gas forces its way up pipe 32 through the liquid column. This results in both gas and liquid climbing pipe 32 as a two-phase foam-like mixture. The vertical distance, $H_{foam}$, of such climb can be determined analytically and/or experimentally but is likely to be greater than $H_{Liquid}$.

Thus, in view of the factors discussed above, the vertical extension of pipe 32 is preferably >$H_{Liquid}$, more preferably >$H_{Liquid}$+$H_{\Delta P}$, and most preferably >$H_{Liquid}$+$H_{\Delta P}$+$H_{foam}$.

As shown in FIG. 6, pipe 32 branches off the pipeline at downhill section 33. This helps significantly in reducing the turbulence at position $P_{g1}$ because flow in downhill sections tends to be completely stratified even at very high gas flowrates. In this way liquid/gas interaction at $P_{g1}$ can be reduced.

Particularly during transient operation, there can be a tendency for liquid to climb up pipe 32. To encourage this liquid to run back down pipe 32, it might be thought that pipe 32 should be inclined from the vertical, as the gas which is also trying to climb the pipe should then be able to pass over the returning liquid rather than having to push its way through a liquid "plug". That is, in an inclined pipe the gas and returning liquid can stratify. However, the present inventors found that the amount of inclination needed to stratify the gas and returning liquid is so great as to be impractical to implement. Thus, the simple vertical configuration has been found most practical.

At the top of pipe 32, the gas diverter continues as a near horizontal pipe 34. However, inclining pipe 34 uphill by a few degrees, θ, allows any liquid that is carried over with the gas, especially during initial transient phases, to fall back into the pipeline via pipe 32.

It appears that the pipe diameter of the gas diverter is not particularly significant. The present inventors have successfully trialled a 2-inch (51 mm) pipe diameter, and this should be adequate for most oilfield pipeline applications. Pressure drop calculations suggest that even 1-inch (25 mm) diameter pipe will suffice in many scenarios.

The gas diverter can be used to divert the gas away from the extraction and control zone of the separator and then to rejoin the diverted gas to the oil flowing downstream from the water extraction zone. A diverter adapted for such operation is shown schematically in FIG. 6 by the dashed lines which extend the gas diverter pipework to rejoin the oil stream at point $P_{g2}$. $P_{g2}$ is on downhill section 35 of the pipeline downstream of the uphill section. In downhill flow, liquid and gas remain stratified even at very high flow rates of each fluid. So on a downhill section it is relatively easy for gas to re-enter a pipeline carrying a liquid stream, whereas the same may not be the case for gas re-entry to uphill liquid flow. The elevation of point $P_{g2}$ is lower than the elevation of point $P_{g1}$ to ensure that liquid will not climb up in the gas diverter vertical pipe.

Alternatively, as conditions or requirements demand, the gas can be routed elsewhere and not rejoined to the oil stream.

The gas diverter can be equipped with a control valve in case the operator wishes to isolate the gas diverter line. However, without such a valve, the gas diverter shown in FIG. 6 is a completely passive system.

The separator can also incorporate a number of flow meters, namely: a gas flow meter for measuring the flow rate of gas removed by the gas diverter 31 can be located at position A; an oil flow meter for measuring the flow rate of the oil which remains in the pipeline can be located at position B; and a water flow meter for measuring the flow rate of extracted water can be located at position C. These meters, which can be simple single phase flow meters of known type, advantageously allow the separator to function as a multiphase flow meter.

Figure 7:
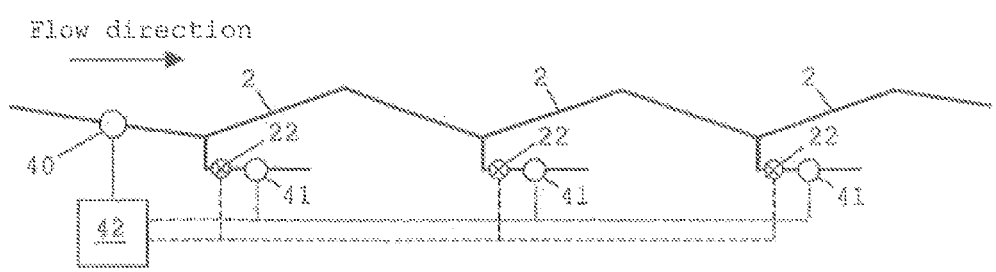
FIG. 7 shows schematically a further oil pipeline having a series of in-line separators according to a fourth embodiment of the present invention.

FIG. 7 shows schematically a further oil pipeline having a series of in-line separators according to a fourth embodiment of the present invention. The pipeline carries a stratified oil and water flow.

Each separator has a respective uphill section 2. Upstream of its uphill section, the first separator has a conventional water cut measuring device 40 for measuring the flow rate of water into the first separator. A gas diverter (not shown) may be fitted upstream of the water cut measuring device 40 if the fluid flow contains gas.

Water sumps extend up each uphill section and respective extraction ports extract proportions of the total water flow from these sumps. The water extraction rate at each port is measured by a respective water flow meter 41. A computer-based control system 42 receives water flow rate measurement signals from the water cut measuring device 40 and the water flow meters 41 and controls valves 22 at each port in such a way that the rate of extraction at each port does not risk oil being extracted with the water. The control system can determine the water flow rate into the second separator by subtracting the extraction rate from the first separator from the flow rate measured by water cut measuring device 40. Similarly, the control system can determine the water flow rate into the third separator by subtracting the extraction rate from the first and second separators from the flow rate measured by water cut measuring device 40.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of in-line flow separation comprising:
   carrying a gravitationally stratified flow of a first liquid and a second denser liquid along an uphill section of pipeline, whereby the second liquid forms a sump extending uphill from the foot of the uphill section, and an interface between the first and second liquids on the uphill section is inclined from the horizontal,
   extracting the second liquid from the sump, and sensing a position, on the uphill section, of a downstream tail of the sump, and the rate of extraction of the second liquid at the extraction port is controlled on the bases of the behavior of the sump tail.

2. A method according to claim 1, wherein the pipeline is an oil pipeline, the first liquid being oil and the second liquid being water.

3. A method according to claim 1, wherein the angle of inclination of the uphill section to the horizontal is in the range from 2° to 6°.

4. A method according to claim 1, wherein the length of that portion of the uphill section over which the position of the sump tail is sensed by the sensor arrangement is at least a distance of 15 D, where D is the internal diameter of the pipeline.

5. A method according to claim 1, wherein the position of the sump tail is sensed using a plurality of sensors spaced along the uphill section, the sensors determining the position of the sump tail on the basis of differing properties for the first and second liquids.

6. A method according to claim 5, wherein each sensor is an electronic sensor comprising a spark plug, as manufactured for use in an internal combustion engine, the spark plug performing electrical measurements across the wall of the pipeline.

7. A method according to claim 1, wherein the characterisation of the flow rate of the second liquid into the uphill section is performed by determining the cut of the second liquid, and the rate of extraction of the second liquid at the extraction port is controlled on the basis of the determined second liquid cut.

8. A method according to claim 7, further comprising the step of measuring the flow rate of second liquid extracted at the extraction port.

9. A method according to claim 1, further comprising removing gas from the pipeline at a position which is upstream of the position at which the second liquid is extracted from the sump.

10. A method according to claim 9, further comprising carrying the stratified flow in a downhill section of the pipeline which is upstream of the uphill section, gas being removed from the pipeline on the downhill section.

11. A method according to claim 9, wherein the gas is removed by a gas diverter comprising a pipe extending substantially vertically upwards from the upper side of the pipeline.

12. A method according to claim 9, further comprising rejoining removed gas to the pipeline downstream of the uphill section.

13. A method according to claim 12, wherein the elevation of the pipeline position at which gas rejoins the pipeline is lower than the elevation of the pipeline position at which gas is removed from the pipeline.

* * * * *